(12) United States Patent
Leclerre et al.

(10) Patent No.: US 7,396,065 B2
(45) Date of Patent: Jul. 8, 2008

(54) AUTOMOTIVE VEHICLE SEAT FOR ABSORBING SIDE IMPACT ENERGY

(75) Inventors: Frédéric Leclerre, Massy (FR); Gérard Queveau, Le Pin (FR); Paul Queveau, Montravers (FR)

(73) Assignee: Heuliez, Cerizay (FR)

( * ) Notice: Subject to any disclaimer, the term of this patent is extended or adjusted under 35 U.S.C. 154(b) by 130 days.

(21) Appl. No.: 11/285,745

(22) Filed: Nov. 23, 2005

(65) Prior Publication Data

US 2007/0114811 A1   May 24, 2007

(51) Int. Cl.
*B60N 2/427* (2006.01)
(52) U.S. Cl. .................... 296/68.1; 297/216.1
(58) Field of Classification Search ............ 296/187.05, 296/63, 68.1; 297/216.1, 216.16, 216.18, 297/248
See application file for complete search history.

(56) References Cited

U.S. PATENT DOCUMENTS

| | | | |
|---|---|---|---|
| 4,231,607 A | 11/1980 | Bohlin | |
| 4,396,220 A | 8/1983 | Dieckmann et al. | |
| 5,000,509 A * | 3/1991 | Sinnhuber et al. | 296/187.12 |
| 6,237,991 B1 * | 5/2001 | Weber | 296/187.12 |
| 6,299,239 B1 | 10/2001 | Sagawa et al. | |
| 6,742,838 B1 | 6/2004 | Swierczewski | |
| 7,104,592 B2 * | 9/2006 | Song | 296/187.12 |
| 2001/0052724 A1 | 12/2001 | Kamper et al. | |
| 2002/0195838 A1 * | 12/2002 | Motozawa | 296/189 |
| 2004/0108752 A1 * | 6/2004 | Rajasingham | 296/189 |
| 2004/0183337 A1 * | 9/2004 | Wang et al. | 296/187.12 |
| 2004/0195873 A1 | 10/2004 | Saberan et al. | |
| 2006/0290160 A1 * | 12/2006 | Tencer et al. | 296/68.1 |

FOREIGN PATENT DOCUMENTS

| | | |
|---|---|---|
| DE | 42 12 091 | 10/1993 |
| DE | 295 00 093.7 | 5/1995 |
| DE | 102 37 900 | 3/2004 |
| EP | 0 059 147 | 9/1982 |
| EP | 1 266 804 | 12/2002 |

OTHER PUBLICATIONS

US 5,730,482, 03/1998, Kerner et al. (withdrawn)

* cited by examiner

*Primary Examiner*—Jason S Morrow
(74) *Attorney, Agent, or Firm*—Young & Thompson

(57) ABSTRACT

A seat for a motor vehicle includes a seat and a backrest, the seat including inner and outer lateral supporting legs, the legs being placed on either side of the seat and being designed to be joined to the motor vehicle. The seat also has a beam for joining the seat to the inner and outer supporting legs. The beam extends laterally between the supporting legs and is joined to the seat and legs. The joining beam is arranged so as to transmit the energy of a side crash from the outer lateral supporting leg to the inner lateral supporting leg. The inner supporting leg has a structure arranged so as to deform and absorb at least a part of the energy from the side crash.

10 Claims, 3 Drawing Sheets

AUTOMOTIVE VEHICLE SEAT FOR ABSORBING SIDE IMPACT ENERGY

BACKGROUND OF THE INVENTION

The invention relates to a seat of a motor vehicle that enables improved energy absorption in the event of a side crash against the vehicle.

In the event of a side crash against a motor vehicle, in particular with regard to a car seat, the energy of the crash is passed on to the seat and its occupant can, in turn, suffer a crash against the side wall of the vehicle and possibly hit this wall. The crash of the occupant against the wall can be violent and thus dangerous for the occupant of the seat.

DESCRIPTION OF THE RELATED ART

There are known devices that protect the occupant in the event of a side crash. For example, it is possible to provide an air bag device installed in the side of the seatback, which inflates under the effect of a side crash so as to intervene between the occupant of the seat and the side of the vehicle. The occupant, however, still receives an impact against the side wall, but this impact is against the air bag. The occupant does not, therefore, hit the wall, but the impact against the air bag is still violent and can also be dangerous for the occupant, who may receive traumatism caused by the force of the crash.

In fact, such protection devices do not enable an absorption of the energy of the side crash, which would reduce the strength of the impact received by the occupant of the seat and would considerably reduce the violence of the potentially dangerous impacts of the passenger against the wall of the vehicle or the air bag.

It is therefore necessary to have an arrangement that allows part of the energy in a side crash against a motor vehicle to be absorbed. The energy absorption must be sufficient so as to limit, or even eliminate, the impact suffered by the passenger during a side crash.

SUMMARY OF THE INVENTION

The invention aims to fulfill this need by providing a car seat with a supporting leg that can deform in order to absorb a part of the energy of a side crash against the vehicle. The seat according to the invention is arranged so as to transmit the energy of the crash towards the supporting leg in order to absorb the energy.

For this purpose, according to a first aspect, the invention relates to a car seat comprising a seat and a seatback, said seat comprising lateral supporting legs, inner and outer respectively, said legs being arranged on either side of the seat and intended for being joined to the motor vehicle, said seat also comprising a beam for joining the seat to the inner and outer supporting legs, said beam extending sideways between the supporting legs and being joined to said seat and said legs, the joining beam being arranged so as to transmit the energy of a side crash from the outer supporting leg to the inner supporting leg and the inner supporting leg having a structure arranged so as to deform and absorb a part of the energy of the side crash.

Thus, in the event of a crash against a side wall of the motor vehicle, the energy of the crash is partially transmitted to the outer lateral supporting leg of the seat, the joining beam transmits the energy of the crash from the outer leg to the inner leg, which deforms absorbing a part of the energy. Thus, the effect of the crash on the occupant of the seat is greatly reduced, which in turn reduces the risk of injury during the crash.

According to a second aspect, the invention relates to a row of car seats, comprising at least two seats such as described above, said row comprising an inner lateral leg placed between the two seats, said inner leg forming a shared inner supporting leg for both the seats.

The inner supporting leg can therefore be joined to two seats arranged on either side of this leg. The inner supporting leg then makes it possible to absorb the energy from side crashes against the vehicle regardless of the side wall against which the crash takes place. Such an embodiment makes it possible to simplify the structure of the row and only requires one inner supporting leg for two car seats.

BRIEF DESCRIPTION OF THE DRAWINGS

Further objectives and advantages of the invention will appear throughout the following description, made in reference to the appended drawings, in which.

DETAILED DESCRIPTION OF THE PREFERRED EMBODIMENTS

In the description, the term "longitudinal" is defined in relation to the front-to-back direction of the vehicle, the terms "side", "lateral", "inner" and "outer" are defined in relation to a direction that is essentially horizontal and perpendicular to the longitudinal direction. The terms "on", "under", "top" and "bottom" are defined in relation to the direction of the elevation of the vehicle.

The following is a description of a seat of a motor vehicle 1 comprising a seat 2 and a seatback 3, made in reference to the figures.

Figure 1:
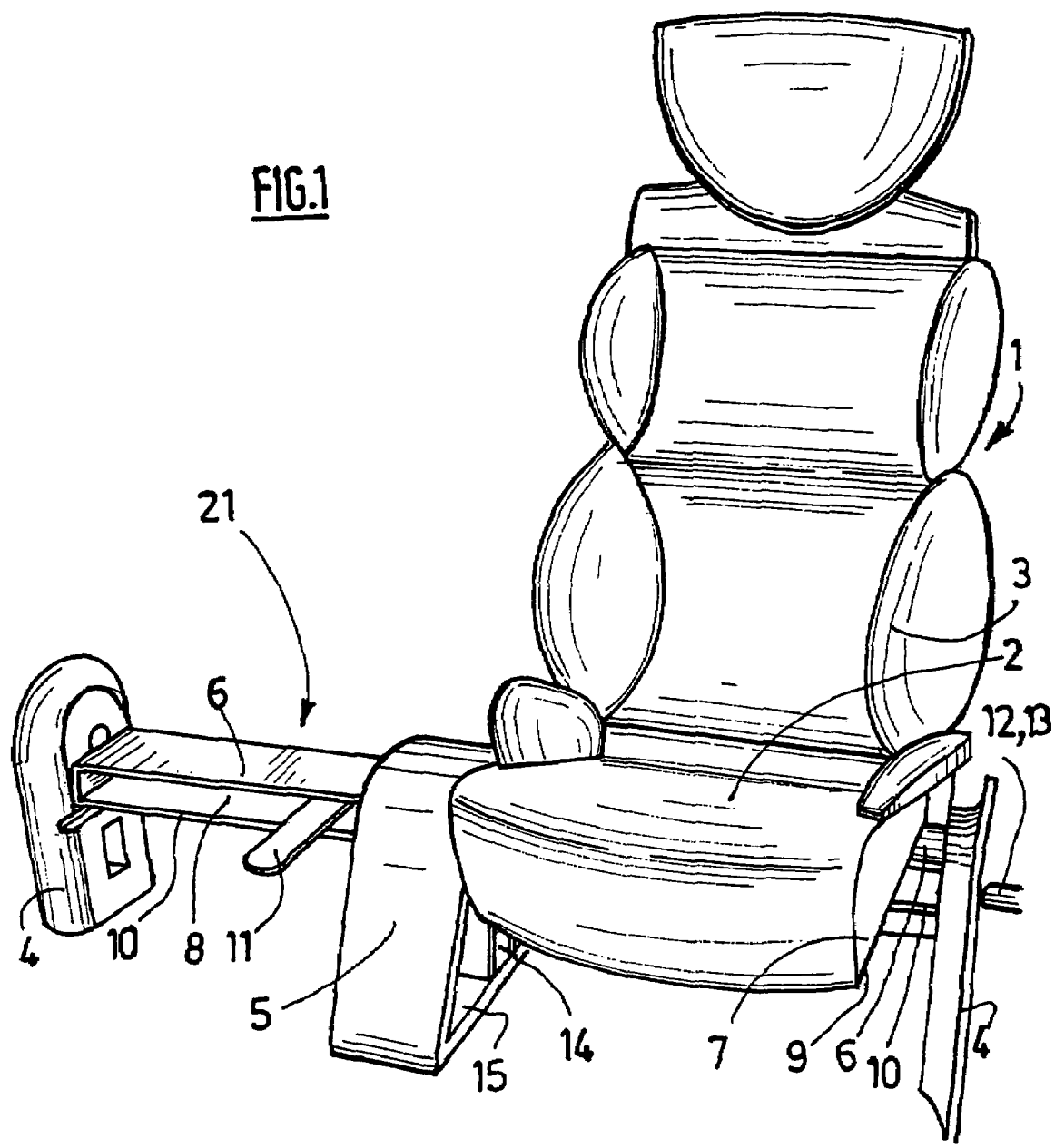
FIG. 1 is a schematic representation in perspective of a seat according to the invention and a joining beam joined to the inner lateral supporting leg and to an outer lateral supporting leg belonging to the second seat in a row of seats.
Figure 2:
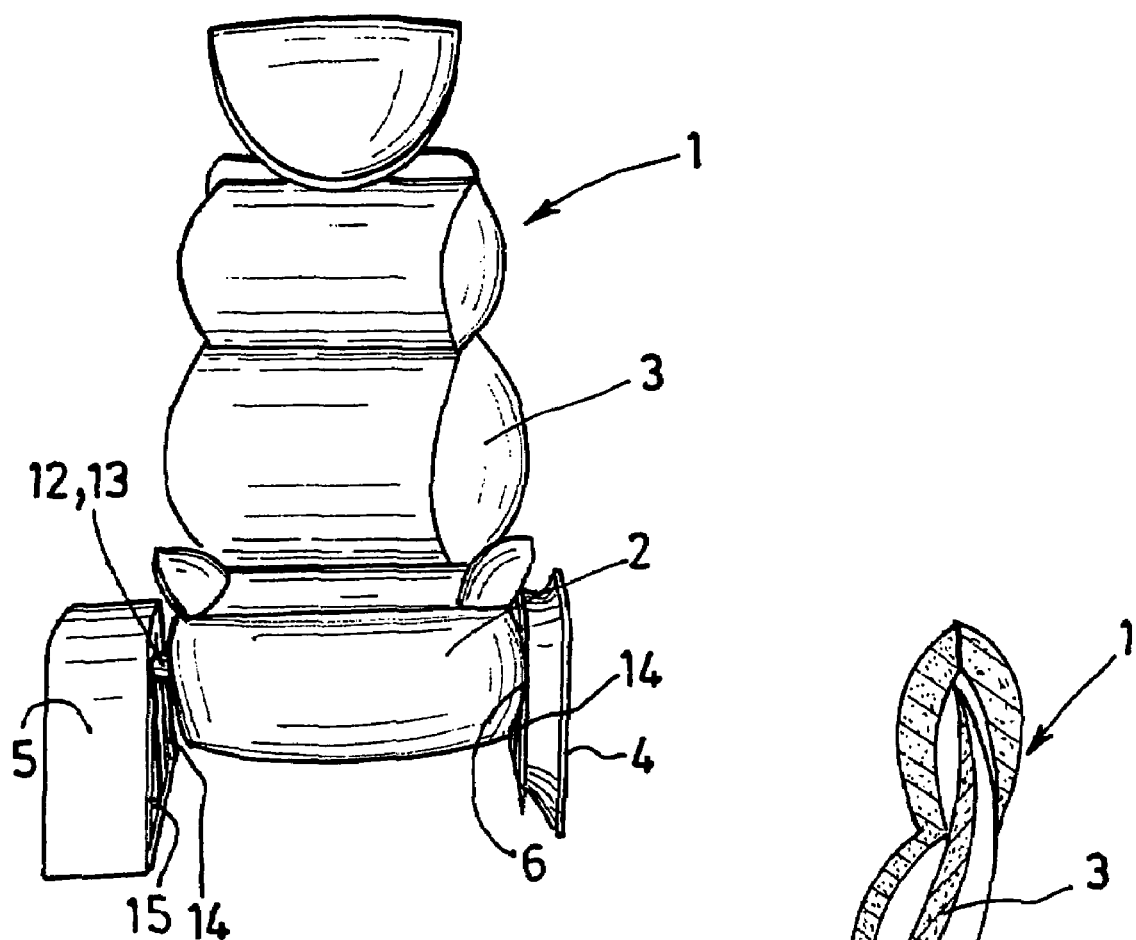
FIG. 2 is a schematic representation in perspective of a seat according to the invention viewed from the front.
Figure 3:
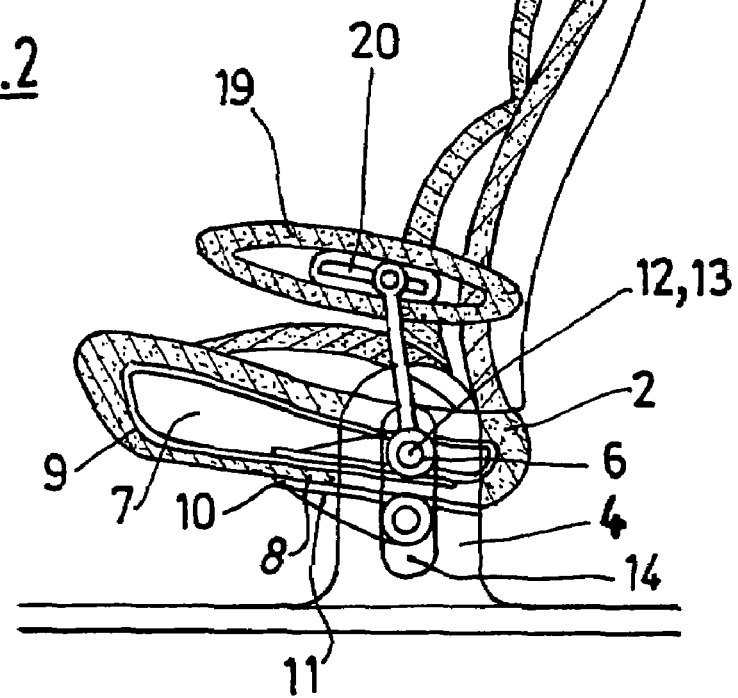
FIG. 3 is a schematic representation of a seat according to a constructive method, said seat being viewed from the side.

The seat 1 also comprises lateral supporting legs of the seat, outer 4 and inner 5 respectively. In other words, the outer lateral supporting leg 4 is located essentially with regard to a side wall of the motor vehicle, and the inner lateral leg 5 is arranged on the inside of the passenger compartment, for example between two seats in a row of seats in a motor vehicle. The lateral supporting legs 4 and 5 are arranged laterally on either side of the seat 2. As shown in FIGS. 1 to 3, the supporting legs 4 and 5 are intended for being joined to the floor of the vehicle.

The seat 1 comprises a beam 6 that joins the seat 2 to the supporting legs 4 and 5. The joining beam 6 extends laterally between the supporting legs 4 and 5 and is joined to the seat 2 and to the legs 4 and 5.

For this purpose, according to a constructive method, the beam 6 can be joined to the bottom of the seat 2, which rests on the beam 6. According to another embodiment shown in the figures, the seat 2 and the beam 6 each comprise a central opening 7 and 8, through which a part of the beam 6 and a part of the seat 2 respectively pass. Thus, according to this embodiment and as shown in FIG. 3, the top of the beam 6 passes through the opening 7 of the seat 2 and the bottom of the seat 2 passes through the opening 8 of the beam 6, this bottom part 9 resting on the bottom part 10 of the beam.

The bottom 10 of the beam 6 can include at least one guiding rail 11 that extends in an essentially longitudinal direction, as shown in FIGS. 1 and 3. The guiding rail 11 cooperates with additional means (not shown) provided on the seat, such as a roller provided so as to move longitudinally along the rail 11. Thus, the position of the seat 2 becomes longitudinally adjustable; in other words, the seat can move forwards or backwards in relation to the beam 6. According to the embodiment shown in FIG. 1, the bottom part 10 comprises two guiding rails 11, shifted sideways.

The beam 6 comprises, at its lateral ends, means 12 for joining it to the supporting legs 4 and 5. These joining means 12 are, for example, formed by tubular elements 13 that extend essentially sideways and project from the seat 2. The tubular elements 13 are joined in a mobile fashion in translation with the relevant grooves 14 made in each of the supporting legs 4 and 5. The grooves 14 extend essentially perpendicular to the longitudinal and lateral directions so that the height of the seat 2 can be adjusted by sliding the tubular elements 13 in the grooves 14. Means for blocking the sliding movement are provided in order to fix the height of the seat 2 once it has been adjusted.

The outer lateral supporting leg 4 is arranged so as to oppose low resistance to a lateral stress. Thus, when a lateral stress, such as a crash, is exerted on the outer leg 4, it transmits the energy of this stress laterally. The material chosen for making the outer lateral supporting leg 4 as well as its small lateral dimension make it possible to adjust the low resistance to a lateral stress.

The inner lateral supporting leg 5 is in the form of a box beam, in other words, its size along the lateral direction is considerable. In addition, the inner leg 5 has a structure in which its exterior has an essentially triangular shape, the base of the triangle being designed so as to rest against the floor of the motor vehicle, as shown in FIGS. 1 and 2. On either side of the groove 14, lateral openings 15, with a triangular shape and essentially symmetric, are made in this structure. The openings 15 take up a large part of the inside of the box beam so as to form a bridge of central material that extends from the bottom to the top of the inner supporting leg 5. The groove 14 is made in this bridge of material. Such a geometry is straightforward and makes it possible to facilitate and control the deformation of the inner supporting leg 5 during a side crash. In addition, the material chosen for making the inner leg 5 has energy-absorbing properties. By selecting the dimensions of the openings 15, the thickness of the walls of the leg 5 and the nature of the material (for example, steel, aluminium or magnesium) from which it is made, it is possible to determine the desired properties in terms of energy absorption and deformation of the inner leg 5. As an alternative or in addition to the described arrangements, it is possible, in order to further improve the capacity for absorption, to place a material or elements with deformable structures inside the openings 15 or cavities formed inside the inner lateral supporting leg 5.

These characteristics of the inner supporting leg 5 encourage its deformation and the absorption of energy in the event of a side crash, in which the energy is transmitted from the outer lateral supporting leg 4 by means of the beam 6. For this purpose, the beam 6 is rigid enough for transmitting the energy from the outer leg 4 to the inner leg 5.

Thus, in the event of a side crash, a considerable part of the energy caused by this crash is absorbed by the inner lateral leg 5.

Figure 4:
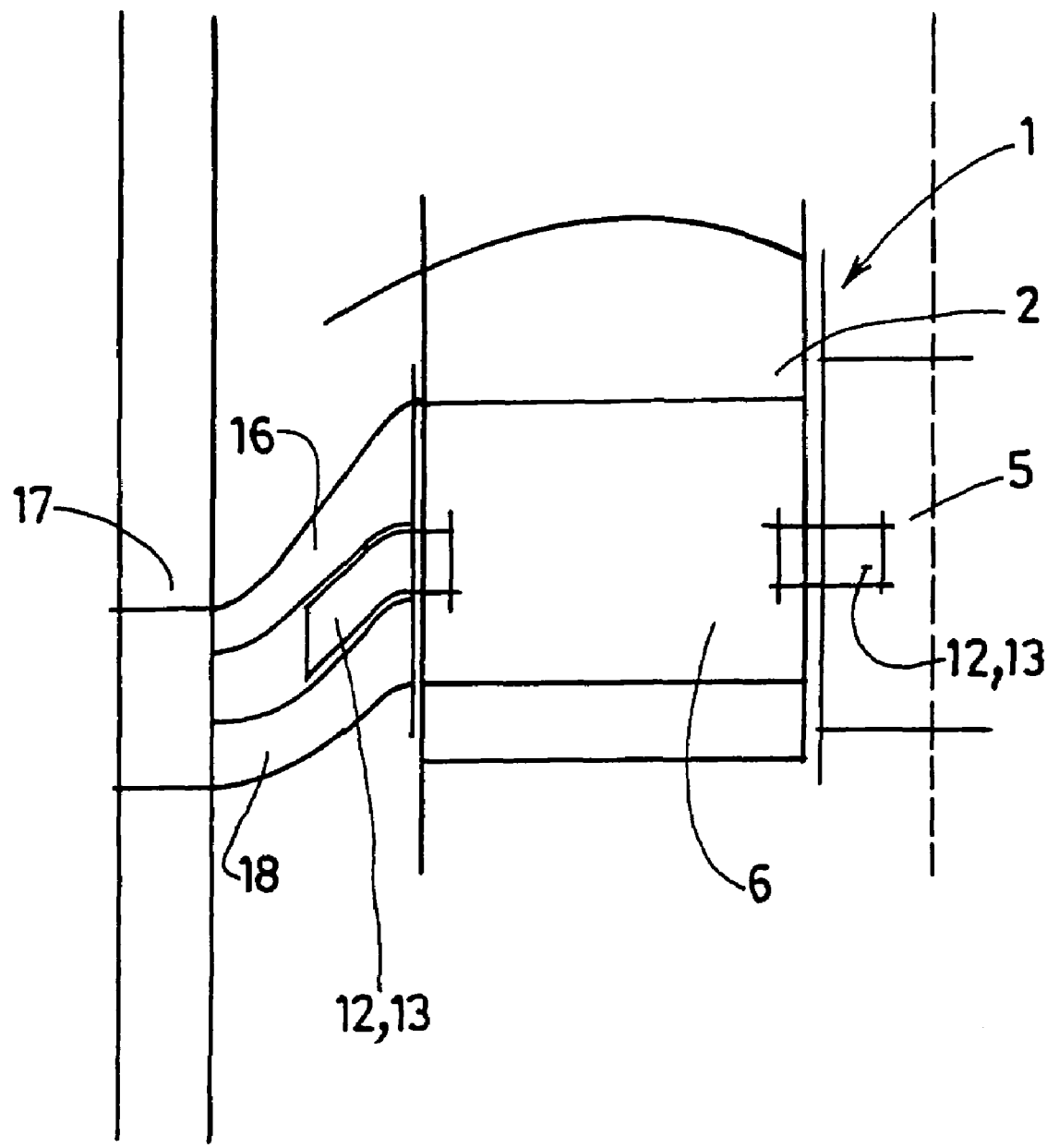
FIG. 4 is a schematic cross-section representation from above of a seat according to another constructive method.

According to an embodiment of the invention shown in FIG. 4, absorption means 16 are provided in order to further increase the absorption of energy in the event of a crash against the side wall of the vehicle, which are joined, preferably bound, to the means 12 for joining the beam to the outer lateral supporting leg 4. The absorption means 16 are designed such as to extend between the joining means 12 and a side wall 17, such as a side wall of the motor vehicle. The absorption means 16 are arranged so as to allow the absorption of at least a part of the energy from a side crash against the side wall 17 before this energy can be transmitted to the outer lateral supporting leg 4. For this purpose, the absorption means 16 include, for example, a sleeve 18 placed around the tubular element 13 and intended to be placed between the tubular element 13 and the side wall 17 of the vehicle. The sleeve 18 is arranged to deform by absorbing the energy of a side crash against the side wall 17. In the embodiment of the invention shown in FIG. 4, the insertion of absorption means 16 between the side wall 17 and the beam 6 makes it possible to obtain a material continuity between the middle leg and the inner lateral supporting leg 5. This material continuity makes it possible to direct the energy of a side crash towards the absorption areas, namely the sleeve 18 and the inner leg 5.

Thus, the amount of energy transmitted to the outer lateral supporting leg 4 is reduced, which makes it possible to distribute the deformation between the absorption means 16 and the inner lateral supporting leg 5 during a crash, the energy to be absorbed thus being distributed between the absorption means 16 and the inner lateral supporting leg 5. In order to distribute the energy between the absorption means 16 and the inner lateral supporting leg 5 it is possible advantageously to adjust the respective capacities of absorption of the absorption means 16 and of the inner supporting leg 5. For example, if you do not want the distance between the seat, and thus the occupant, and the side wall to vary much in the event of a side crash, it is possible to choose absorption means 16 that are considerably stiffer than the inner lateral supporting leg 5.

The arrangements described above make it possible to increase the lateral rigidity of the vehicle. This increase in the lateral rigidity makes it possible, in turn, to reduce and thus to lighten other parts such as the floor or the roof, which would become less important in terms of resistance. The safety of the occupants of the vehicle would thus be improved without a noticeable increase in the weight of the vehicle.

According to an embodiment of the invention shown in FIG. 3, the seat comprises at least one armrest 19. The armrest 19 is, for example, connected to the joining beam 6 by means of a rod such as to allow the position of the armrest 19 to be adjusted in relation to the seat 2. It is possible, for example, to place the rod in rotation around the means 13 for joining the beam 6 to the supporting legs 4 and 5, and thus the tilt and the height of the armrest 19 can be adjusted in relation to the seat 2. Furthermore, the armrest 19 can be provided with means 20 for adjusting its longitudinal position. These adjustment means 20 comprise, for example, a groove that extends longitudinally and with which the rod of the armrest 19 cooperates, as shown in FIG. 3.

This is a description of a row of seats 21 comprising at least two seats 1 such as described above. This row of seats 21 is shown in FIG. 1, in which one of the seats is shown with no seat 2 and no backrest 3.

The seats 1 are essentially aligned along the lateral direction and the row 21 comprises at least two outer lateral supporting legs 4 placed on either side of the row 21 and an inner lateral supporting leg 5 placed between the two seats 1. The inner lateral supporting leg 5 forms an inner supporting leg for the two seats 2, the beam 6 of each of these seats being joined to this inner leg 5. In this way, a saving is made in terms of the number of parts and the structure of the row is simplified 21.

The invention claimed is:

1. Seat for a motor vehicle comprising a seat and a backrest, said seat comprising lateral supporting legs, inner and outer respectively, said legs being placed on either side of the seat and being designed to be joined to the motor vehicle, said seat also comprising a beam for joining the seat to the inner and outer supporting legs, said beam extending laterally between the supporting legs and being joined to said seat and to said legs, wherein the joining beam is arranged so as to transmit the energy of a side crash from the outer lateral supporting leg towards the inner lateral supporting leg, and the inner supporting leg has a structure arranged such as to deform and absorb at least a part of the energy from the side crash, wherein the inner supporting leg has an essentially triangular shape, the base of the triangle being designed so as to rest against the floor of the motor vehicle, the structure having openings that allow it to deform under the effect of a crash.

2. Seat according to claim 1, wherein the inner supporting leg is made from a material that has energy-absorbing properties.

3. Seat according to claim 1, wherein the joining beam comprises, on its lateral ends, means for joining said joining beam to the supporting legs.

4. Seat according to claim 3, wherein the means for joining the beam comprise tubular elements, the supporting legs each comprising at least one groove, inside of which the tubular elements are joined in a mobile fashion in translation such as to enable the height of the seat to be adjusted.

5. Seat according to claim 1, wherein the joining beam comprises at least one guiding rail, said rail cooperating with additional means provided on the seat, said means being arranged so as to enable the longitudinal adjustment of the position of the seat.

6. Seat for a motor vehicle comprising a seat and a backrest, said seat comprising lateral supporting legs, inner and outer respectively, said legs being placed on either side of the seat and being designed to be joined to the motor vehicle, said seat also comprising a beam for joining the seat to the inner and outer supporting legs, said beam extending laterally between the supporting legs and being joined to said seat and to said legs, wherein the joining beam is arranged so as to transmit the energy of a side crash from the outer lateral supporting leg towards the inner lateral supporting leg, and the inner supporting leg has a structure arranged such as to deform and absorb at least a part of the energy from the side crash, further comprising at least one armrest, said armrest being connected to the joining beam so as to allow the adjustment of the position of the armrest in relation to the seat.

7. Seat according to claim 3, further comprising absorption means, said means being joined to the means for joining the beam to the outer supporting leg, said absorption means being designed to extend between the joining means and a side wall of the motor vehicle, said absorption means being arranged so as to allow the absorption of at least a part of the energy of a side crash against said side wall.

8. Seat according to claim 7, wherein the absorption means comprise a sleeve placed around the tubular element and designed such as to extend between said tubular element and the side wall of the vehicle, said sleeve being arranged so as to deform by absorbing the energy of a side crash against the side wall.

9. Row of motor-vehicle seats, comprising at least two vehicle seats, each vehicle seat comprising a seat and a backrest, said each seat comprising lateral supporting legs, inner and outer respectively, said legs being placed on either side of said each seat and being designed to be joined to the motor vehicle, said each seat also comprising a beam for joining said each seat to the inner and outer supporting legs, said beam extending laterally between the supporting legs and being joined to said each seat and to said legs, wherein the joining beam is arranged so as to transmit the energy of a side crash from the outer lateral supporting leg towards the inner lateral supporting leg, and the inner supporting leg has a structure arranged such as to deform and absorb at least a part of the energy from the side crash, said row comprising an inner lateral leg placed between the two vehicle seats, said inner leg forming a shared inner supporting leg for said vehicle seats.

10. Seat according to claim 3, further comprising absorption means, said means being bound to the means for joining the beam to the outer supporting leg, said absorption means being designed to extend between the joining means and a side wall, in the form of a lateral leg, of the motor vehicle, said absorption means being arranged so as to allow the absorption of at least a part of the energy of a side crash against said side wall.

* * * * *